US009945661B2

United States Patent
Suzuki et al.

(10) Patent No.: US 9,945,661 B2
(45) Date of Patent: Apr. 17, 2018

(54) METHOD FOR MEASURING HEIGHT, NON-TRANSITORY COMPUTER READABLE MEDIUM STORING A PROGRAM FOR MEASURING HEIGHT, AND HEIGHT MEASURING APPARATUS

(75) Inventors: Yasuo Suzuki, Yokohama (JP); Masaya Yamaguchi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 842 days.

(21) Appl. No.: 13/617,120

(22) Filed: Sep. 14, 2012

(65) Prior Publication Data
US 2013/0010107 A1 Jan. 10, 2013

Related U.S. Application Data

(63) Continuation of application No. PCT/JP2011/055318, filed on Mar. 8, 2011.

(30) Foreign Application Priority Data

Mar. 16, 2010 (JP) .................................. 2010-059625

(51) Int. Cl.
G01B 21/04 (2006.01)
G01B 11/06 (2006.01)

(52) U.S. Cl.
CPC ........ G01B 21/045 (2013.01); G01B 11/0608 (2013.01)

(58) Field of Classification Search
CPC ............. G03F 7/70358; G03F 7/70833; G01B 11/0608; G01B 21/045
See application file for complete search history.

(56) References Cited

U.S. PATENT DOCUMENTS 5,064,291 A * 11/1991 Reiser .............. G01N 21/95684
348/131
5,151,609 A 9/1992 Nakagawa et al.
(Continued)

FOREIGN PATENT DOCUMENTS

JP 3-63507 3/1991
JP 5-332735 12/1993
(Continued)

OTHER PUBLICATIONS

English-language International Search Report for International Application No. PCT/JP2011/055318 from the Japanese Patent Office dated Apr. 19, 2011.

*Primary Examiner* — Obafemi Sosanya
(74) *Attorney, Agent, or Firm* — Finnegan, Henderson, Farabow, Garrett & Dunner, LLP

(57) ABSTRACT

There are provided a method for measuring a height by a height measuring apparatus including: obtaining, in advance, a height correction value depending on an inclination angle of a surface of the object as an angle correction data; obtaining, from the height value of each pixel of the imaging device, the inclination angle of the surface of the object which corresponds to each pixel position of the imaging device; obtaining the height correction value, which corresponds to the inclination angle obtained, from the angle correction data; and correcting the height value of the surface of the object, which corresponds to each pixel of the imaging device, by using the height correction value obtained.

16 Claims, 11 Drawing Sheets

(56) References Cited

U.S. PATENT DOCUMENTS

| | | | | |
|---|---|---|---|---|
| 5,985,495 | A | * | 11/1999 | Okumura .............. G03F 7/2002 430/22 |
| 6,813,000 | B1 | * | 11/2004 | Nishi ................. G03F 7/70358 355/53 |
| 2003/0007677 | A1 | * | 1/2003 | Hiroi ....................... G06T 7/001 382/149 |
| 2005/0280830 | A1 | * | 12/2005 | Rembe ............... G02B 21/0056 356/511 |
| 2006/0083420 | A1 | | 4/2006 | Kawaguchi |
| 2009/0088999 | A1 | * | 4/2009 | Bryll ................. G01B 11/0608 702/86 |
| 2009/0309022 | A1 | * | 12/2009 | Gunji ................ G01N 23/2251 250/307 |
| 2010/0158348 | A1 | | 6/2010 | Kawaguchi |

FOREIGN PATENT DOCUMENTS

| | | |
|---|---|---|
| JP | 6-201337 | 7/1994 |
| JP | 2003-14431 | 1/2003 |
| JP | 2006-113020 | 4/2006 |

\* cited by examiner

OBJECT

MEASURED IMAGE OF
THE OBJECT

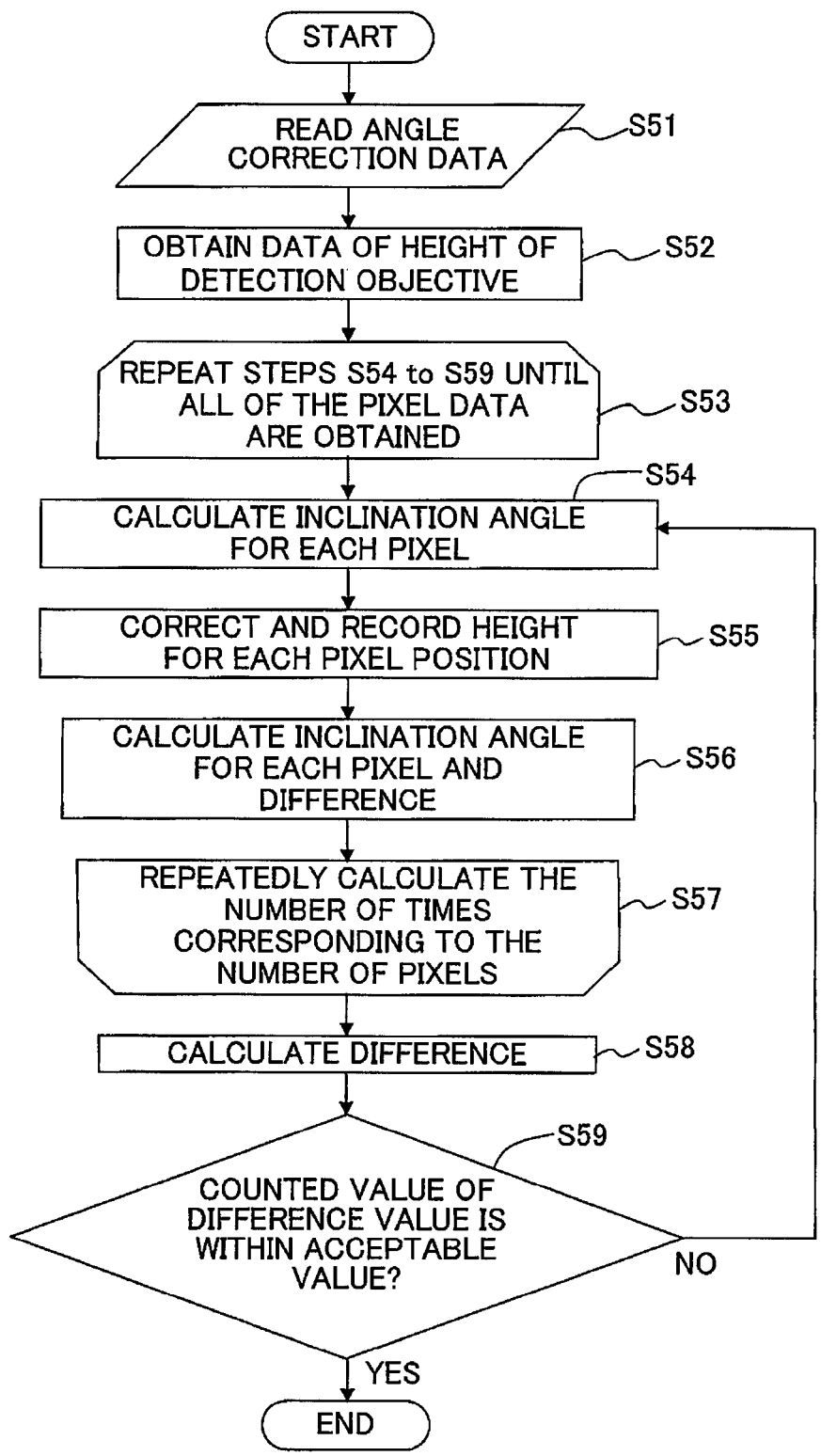

METHOD FOR MEASURING HEIGHT, NON-TRANSITORY COMPUTER READABLE MEDIUM STORING A PROGRAM FOR MEASURING HEIGHT, AND HEIGHT MEASURING APPARATUS

CROSS-REFERENCE TO RELATED APPLICATIONS

This is a Continuation application of International Application No. PCT/JP2011/055318 filed on Mar. 8, 2011 which claims priority to Japanese patent Application No. 2010-059625 filed on Mar. 16, 2010. The contents of the aforementioned applications are incorporated herein by reference in their entirety.

BACKGROUND

Field of the Invention

The present teaching relates to a method for measuring a height of a surface of an object to be measured, a non-transitory computer readable medium storing a height measuring program, and an height measuring apparatus.

Description of the Related Art

Conventionally, it has been suggested a method for measuring a height as follows (for example, see Japanese Patent Application Laid-open No. H06-201337). That is, a texture pattern is illuminated from above and is projected to a surface of an object via a projection optical system. Then, scanning is performed in a direction of an optical axis of an imaging optical system to obtain a position, at which a degree coming into focus (hereinafter "a degree of focus") acquired from images detected by an imaging device is maximized, as a height value of the surface of the object.

However, in the conventional measuring method, there is generated a problem such that error is caused in the height value, which is measured depending on an inclination angle of the surface of the object, due to various aberrations such as spherical aberration of the projection optical system and/or the imaging optical system.

SUMMARY

According to an aspect of the present teaching, there is provided a method for measuring a height of each region of an object by a height measuring apparatus which comprises an imaging device and an imaging optical system for forming an image of the object to an imaging plane of the image device, the method, the method comprising: scanning the object relative to the imaging optical system along an optical axis of the imaging optical system, acquiring a height value of each region of the object based on a degree coming into forces acquired from images detected by the imaging device, obtaining, from the height value of each region of the imaging device, the inclination angle of the surface of the object which corresponds to each pixel position of the imaging device;

obtaining the height correction value, which corresponds to the inclination angle obtained, from the angle correction data; and correcting the height value of the surface of the object, which corresponds to each region of the imaging device, by using the height correction value obtained.

BRIEF DESCRIPTION OF THE DRAWINGS

FIG. 3A shows a true height value of a surface of an object; FIG. 3B shows a height value measured by the height measuring apparatus.

FIG. 10 is a flowchart showing a height correction algorithm in the height measuring apparatus according to the embodiment.

DESCRIPTION OF THE EMBODIMENTS

An explanation will be made with reference to drawings about a method for measuring a height, a height measuring program, and a height measuring apparatus according to an embodiment of the present application. Noted that the following embodiment is merely an example for making it possible to understand the teaching easily, and is not intended to exclude that addition, replacement, etc., which can be performed by those skilled in the art, are performed without departing from technical idea of the teaching of the present application.

Figure 1:
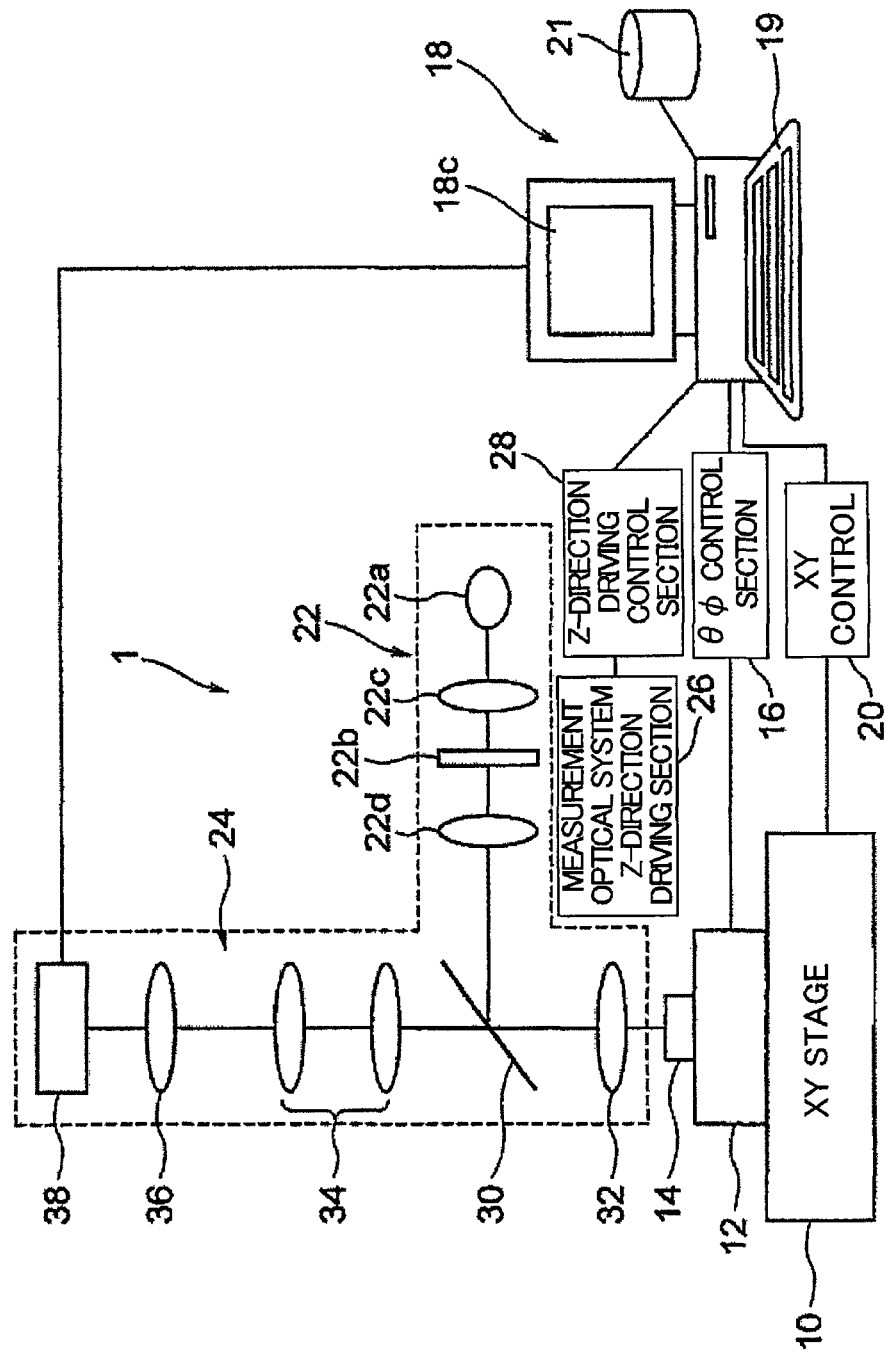
FIG. 1 is a schematic configuration diagram of a height measuring apparatus according to an embodiment of the present application.
Figure 2:
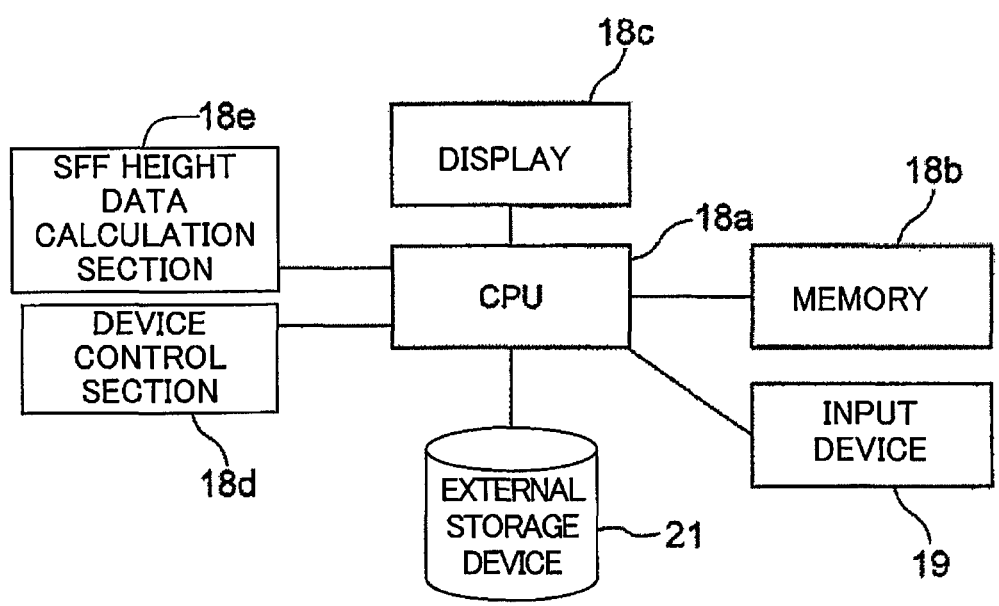
FIG. 2 is a block diagram of a controller device of the height measuring apparatus according to the embodiment.

In FIGS. 1 and 2, a tilt/rotation stage 12 is placed on an XY stage 10, and an object 14 is placed on the tilt/rotation stage 12 in a height measuring apparatus 1 according to the embodiment. The object 14 is subjected to an inclination about two axes (θ, Φ) by the tilt/rotation stage 12. Inclination angles (θ, Φ) of the tilt/rotation stage 12 are controlled by a computer 18 via a θΦ control section 16. Further, movement of the XY stage 10 is controlled by the computer 18 via a XY stage control section 20.

A measurement optical system is formed of an epi-illumination device 22 and an imaging optical system 24. The measurement optical system is entirely driven by a Z-direction driving section 26 along an optical axis (Z direction) of the imaging optical system 24. Driving of the Z-direction driving section 26 is controlled by the controller 18 via a Z-direction driving control section 28. Movement in the Z direction may be performed by the movement of the XY stage 10.

The epi-illumination device 22 is formed of a light source 22a, a lens 22c through which a light from the light source is collected and then is irradiated to a projection pattern 22b, a lens 22d through which the light from the projection pattern 22b is emitted in a direction in which a half mirror 30 is provided, and an objective lens 32 through which the projection pattern reflected at the half mirror 30 is projected on the object 14. With respect to the projection pattern 22b, it is possible to use various patterns such as a grating-shaped pattern, a checked pattern, and a striped pattern; and an appropriate pattern is selected and projected depending on a surface state of the object 14 or by using a frequency separation method, as will be described later on, etc. The projection pattern 22b is detachable with respect to the optical axis of the epi-illumination device 22. In a case that the projection pattern 22b is removed from the optical axis, a general epi-illumination can be performed. In the following description, an explanation will be made about a case in which the projection pattern is projected to the object 14. However, it is needless to say that the general epi-illumination can be similarly performed.

A light of the projection pattern projected on the object 14 is collected by the objective lens 32 and transmits the half mirror 30. Then, an image of the projection pattern is formed on an imaging plane (for example, CCD) of an imaging device 38, which is formed of a plurality of pixels, by an imaging lens 36 via zoom lenses 34. A taken image of the object 14 is processed by an image processing section of the computer 18, is stored in a memory 18b of the computer 18, and is displayed on a display 18c of the computer 18.

The height measuring apparatus 1 according to this embodiment is an apparatus which is capable of measuring a height of the surface of the object 14 by a publicly known SFF (abbreviation of Shape From Focus, and the SFF is used as the abbreviation of Shape From Focus in the followings). In the SFF method, a height measurement is performed as follows. That is, degree of focus information of the projection pattern, which is projected on the object 14 while allowing the measurement optical system to move in an optical axis direction, for example, a position at which contrast is maximized, is regarded as a surface position of the object. A height value of the surface of the object 14 is accordance with the distance between a surface, which is measured by the height measuring apparatus 1, of the object 14 and a reference plane, which is virtually set, of the height measuring apparatus 1 along an optical axis of the objective lens 32. The SFF method is a publicly known method, and any detailed explanation of which will be omitted.

As shown in FIG. 2, the computer 18 includes a CPU 18a, the memory 18b, a SFF height data calculation section 18e, a device control section 18d which controls driving control sections 16, 20, 28, and programs for various controls or calculations. Further, the computer 18 is connected to an input device 19 (for example, a keyboard and a mouse) through which condition and the like is inputted, an external storage device 21 such as a hard disk drive, and the like.

Further, in the height measuring apparatus 1 according to this embodiment, it is possible to provide an unillustrated contact-type measuring probe (hereinafter, referred to as test point (TP) in an abbreviated manner) to measure the height value and/or an inclination angle θ of the surface of the object 14; and it is possible to obtain an angle correction data, as will be described later on, by loading the inclination angle and/or the height value measured by the TP into the computer 18.

As described above, the height measuring apparatus 1 according to this embodiment is constructed.

In a conventional height measuring apparatus 1, the following fact has been found out. That is, in a case that there are various optical aberrations such as spherical aberration in the epi-illumination device 22 and/or the imaging optical system 24 used in the SFF measurement, the height value of the surface of the object 14 is measured in a deviated state depending on the inclination angle of the surface, and thus error is included in the height value. Noted that the inclination angle refers to an angle between a vertical axis (corresponding to the optical axis) and a normal of an object tangent plane at a position at which a light beam is irradiated. In a case that there are the various aberrations such as the spherical aberration in the optical system, the error of the height value changes depending on the inclination angle of the surface of the object 14. The reason thereof is as follows. That is, in the optical system formed of lenses, the various aberrations such as the spherical aberration in a circumferential portion of an optical axis I are larger than those in the vicinity of the optical axis I. Thus, the larger the inclination angle of the surface of the object 14 is, the more likely that a main light beam of the light reflected at the surface passes through the periphery of each lens, and thereby increasing the error of the height value.

In the height measuring apparatus 1 of this embodiment, it is possible to correct the error due to the various optical aberrations, and it is possible to realize that the height value of the surface of the object 14 is measured more accurately.

Figure 3A:
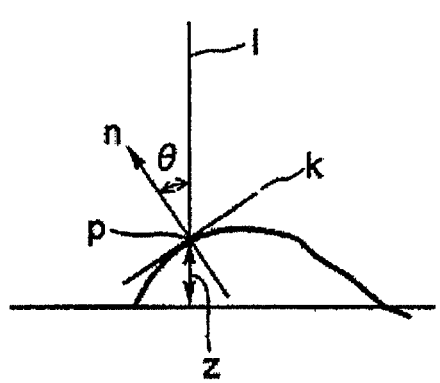
FIGS. 3A and 3B are conceptual views each showing error of a height value due to various aberrations.
Figure 3B:
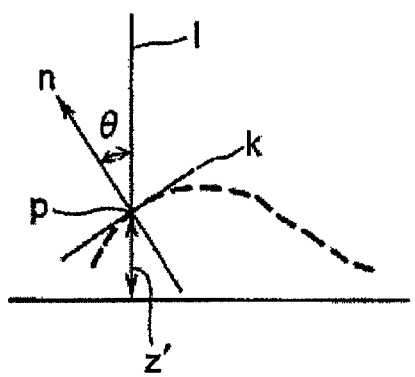

FIGS. 3A and 3B are views each conceptually showing the error of the height value. In general, the various aberrations of the optical system are rotationally symmetrical. Thus, also with respect to the inclination angle, one component can be used as a representative. However, in an optical system having an asymmetric component, angle data of n-component associated with the asymmetry is required. In the following, an explanation will be made about a case in which the aberrations of the optical system are rotationally symmetrical. However, it is needless to say that in a case that the optical system has the asymmetric component, data corresponding to the asymmetric component is included.

FIG. 3A shows a cross section which includes the vertical axis I (equivalent to the optical axis) and which is obtained from a result of measurement of a three-dimensional profile of the object 14 performed in a state that the unillustrated TP is provided in the height measuring apparatus 1 of this embodiment. In a case that the surface of the object 14 is measured by the TP, the error is not included in the height value and a true height value Z is obtained. An angle (inclination angle) between the vertical axis I and a normal n of an object tangent plane k at a position P of the object 14 can be calculated from at least three TP measurement data. In the TP measurement, the height value of the surface of the object 14 is obtained as a function of the inclination angle θ at each position; and this is described as Z (θ).

On the other hand, in a case that the height value of the surface of the same object 14 as that measured by the TP is measured by the height measuring apparatus 1 of this embodiment, a height value Z' which includes the error caused by the effect of the spherical aberration and the like, is measured. As shown in FIG. 3B, the height value Z' of a surface image of the measured object 14 is obtained as a height value, at a pixel position of the imaging device 38 (see FIG. 1), which corresponds to the position P of the object 14. Further, the inclination angle θ at this pixel position can be calculated from height values of at least three pixels around the pixel at said pixel position. Also in this case, the inclination angle θ is the angle between the optical axis I and the normal n of the object tangent plane at the position into which the light beam comes. As described above, the height measuring apparatus 1 of this embodiment is capable of obtaining the height value Z' and the inclination angle θ of the obtained surface image of the object 14; and this is described as Z'(θ).

Then, a difference ΔZ(θ) between the height value Z (θ) obtained by measuring the object 14 using the TP and the height value Z'(θ) obtained by measuring the same object 14 as that measured by the TP using the height measuring apparatus 1 of this embodiment is obtained as a height correction value $\Delta Z(\theta)$ ($\Delta Z(\theta)=Z'(\theta)-Z(\theta)$). By obtaining the height correction values $\Delta Z$ with respect to various inclination angles, relations between the various inclination angles $\theta$ and the height correction values $\Delta Z$ are stored in the memory 18b of the computer 18.

Figure 4:
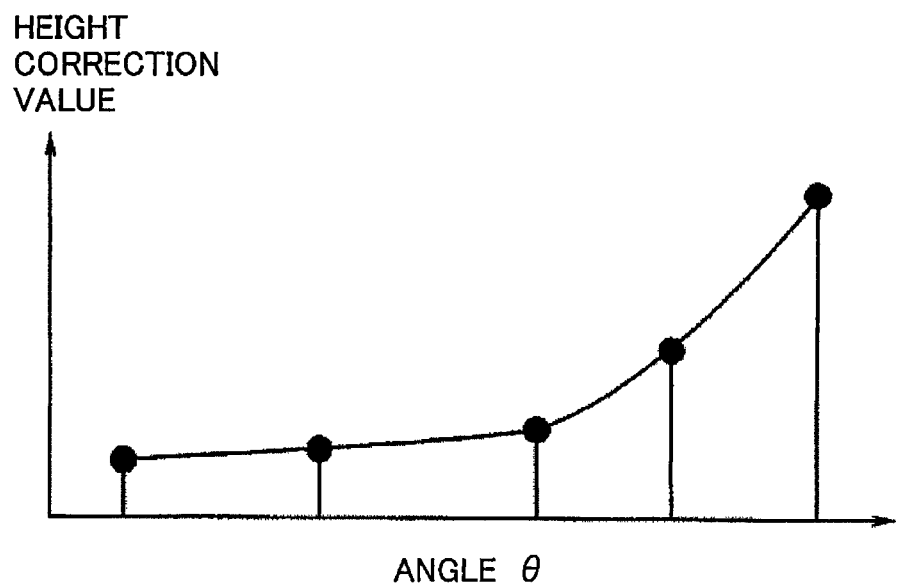
FIG. 4 conceptually shows a relation between an inclination angle and a height correction value.

FIG. 4 is an example in which the relation between each of the various inclination angles $\theta$ and each of the height correction values $\Delta Z$ for one pixel of the imaging device 38 is depicted in a graph. There is shown in FIG. 4 that the height correction value $\Delta Z$ is increased as the inclination angle $\theta$ becomes larger. The reason thereof is as follows. That is, as described above, in the optical system formed of the lenses, the various aberrations such as the spherical aberration in the circumferential portion of the optical axis I are larger than those in the vicinity of the optical axis I. Thus, the larger the inclination angle $\theta$ of the surface of the object 14 is, the more likely that the main light beam of the light reflected at the surface passes through the periphery of each lens, and thereby increasing the correction value of the height value. With respect to an angle, of which inclination angle is not yet measured, it is possible to obtain the height correction value with respect to each of the various inclination angles by performing interpolation calculation from the measured data, based on the relation between the inclination angle and the correction value as shown in FIG. 4.

As described above, in the height measuring apparatus 1 of this embodiment, the true height value ($Z=Z'-\Delta Z$) of the object 14 can be calculated as follows. That is, the angle correction data corresponding to condition of the epi-illumination device 22 and/or the imaging optical system 24 is obtained in advance and is stored in the memory 18b. Then, the inclination angle of the pixel corresponding to the position, at the surface image of the object 14 measured by the height measuring apparatus 1, into which the light beam comes, is calculated from pixels around said pixel and the height value of the pixel measured by the height correction value corresponding to the calculated inclination angle is corrected. By performing the above processes for all of portions of the surface of the object 14 in a similar manner, it is possible to obtain the height value of the object 14 more accurately.

Figure 5:
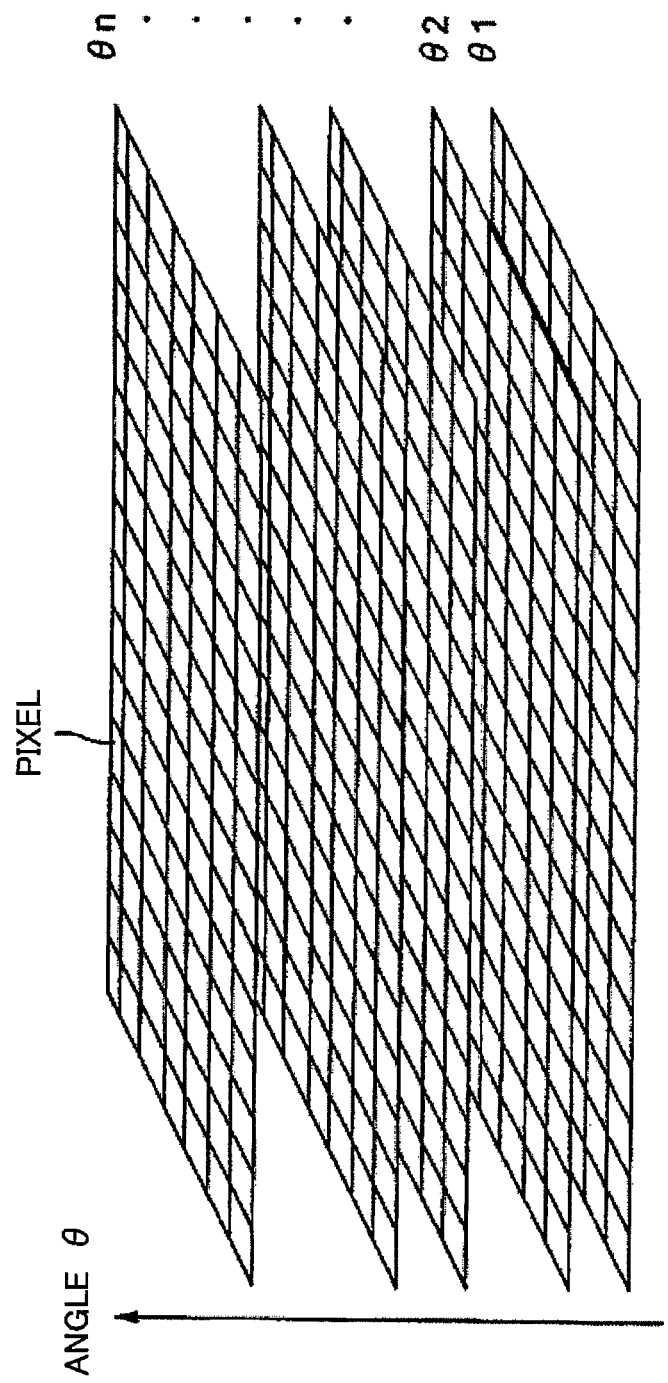
FIG. 5 is a conceptual view in a case that correction is performed by using the inclination angle and the height correction value corresponding to each pixel position.
Figure 6:
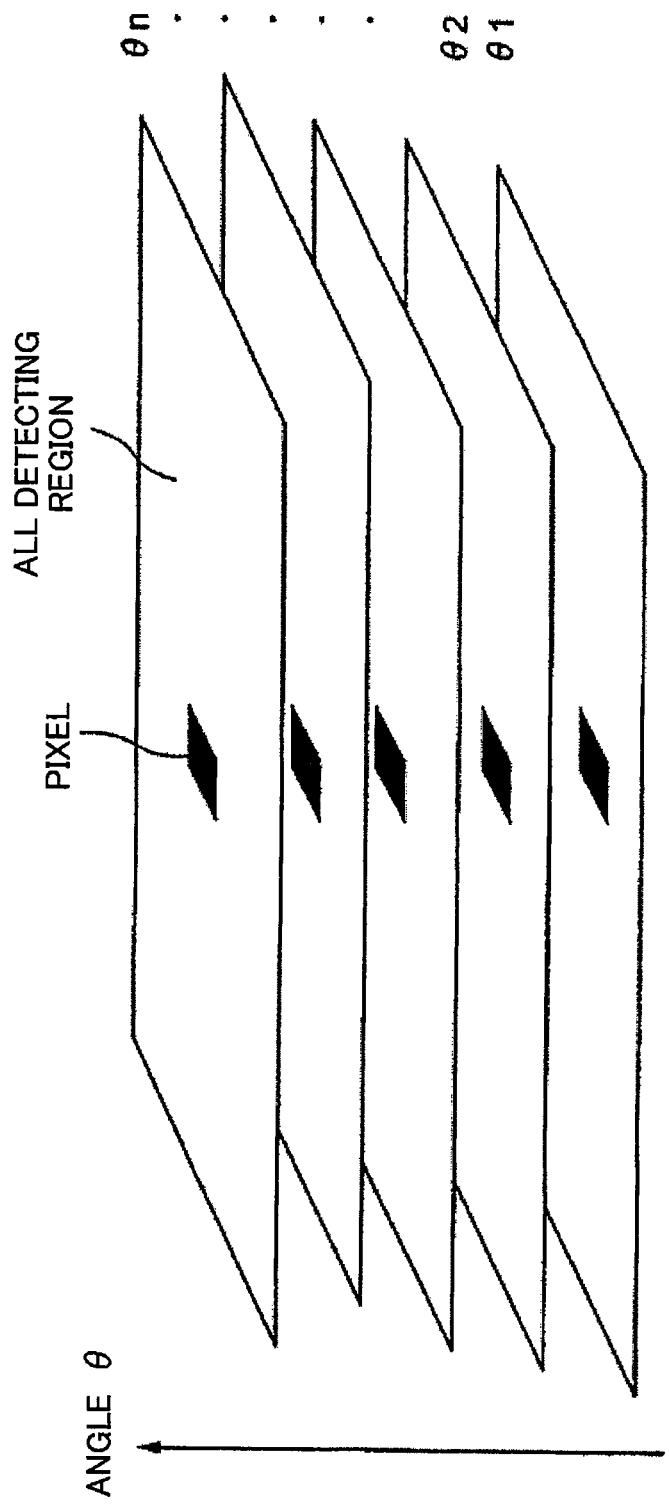
FIG. 6 is a conceptual view in a case that the correction is performed by using the inclination angle and the height correction value per all detecting region of the imaging device.

FIGS. 5 and 6 are views each conceptually showing content of the angle correction data.

FIG. 5 shows a case in which the height correction value is obtained depending on each of the inclination angles (for example, $\theta 1$ to $\theta 5$) corresponding to each of all of the pixels of the imaging device 38 and data of the angle correction data is stored. In this case, the number of data pieces of the correction data is obtained by multiplying the number of inclination angles to be measured by the number of pixels. The height correction value depending on the inclination angle at the position corresponding to each of all of the pixels is suitable for a case in which the various aberrations such as the spherical aberration of the optical system have considerable effect on the height measurement value. For example, in a case that the angle correction data (height correction value $\Delta Z$ with respect to the inclination angle) at the pixel position in the vicinity of the circumference of the optical axis is large as compared with that at the pixel position in the vicinity of the optical axis (corresponding to a case in which the height correction value $\Delta Z$ for each pixel with respect to one inclination angle $\theta$ is considerably varied); and that the height value measured by one height correction value is corrected, there is fear that the accurate height value can not be obtained for lack of accuracy. However, by obtaining the height correction values corresponding to all of the pixels, it is possible to correct the height value with a high degree of accuracy. As described above, by obtaining the height correction values depending on the inclination angles at the positions corresponding to all of the pixels, it is possible to correct each of the height values with the high degree of accuracy even when the optical system having the various aberrations, of which degrees are great, is used.

FIG. 6 shows a case in which a least-squares plane, which means a plane set by the least squares method, is calculated for each of the inclination angles (for example, $\theta 1$ to $\theta 5$) by using the height correction values of all of the pixel positions of the imaging device 38; deviation from the center of the least-squares plane is obtained as a representative height correction value; and the angle correction data is stored. In this case, the number of data pieces of the correction data corresponds to the number of inclination angles to be measured. Obtaining the representative height correction value depending on each of the inclination angles as the data is suitable for a case in which the effect on the height measurement value due to the various aberrations such as the spherical aberration of the optical system is small. For example, in a case that the angle correction data (height correction value $\Delta Z$ with respect to the inclination angle) at the pixel position in the vicinity of the circumference of the optical axis is small as compared with that at the pixel position in the vicinity of the optical axis (corresponding to a case in which variation of the height correction value $\Delta Z$ for each pixel with respect to one inclination angle $\theta$ is small), even when the height value measured by one height correction value is corrected, it is possible to correct the height value with the high degree of accuracy. Accordingly, by obtaining the height correction value per all detecting region of the imaging device depending on each of the inclination angles, it is possible to correct the height value with the high degree of accuracy by using a small amount of data; and it is possible to facilitate speed-up of the measurement in the height measuring apparatus 1.

Noted that as to whether or not the angle correction data is obtained corresponding to each of all of the pixels or as to whether or not the angle correction data is obtained per all detecting region of the imaging device 38 can be appropriately selected based on aberration characteristics of the optical system of the height measuring apparatus 1. Further, it is possible to obtain the angle correction data by including both of the data obtained corresponding to each of all of the pixels and the data obtained per all detecting region of the imaging device 38 depending on each of the inclination angles. It is allowable to obtain the height correction value per all detecting region of the imaging device 38 for the inclination angle in which the effect of the aberration is small; and it is allowable to obtain the height correction value at the position of each of all of the pixels for the inclination angle in which the effect of the aberration is large. Accordingly, it is possible to reduce the data amount of the angle correction data.

Next, an explanation will be made about a method for obtaining the angle correction data and a method for correcting the height value measured by using the angle correction data, with reference to respective flowcharts.

(First Method for Obtaining Angle Correction Data)

Figure 7:
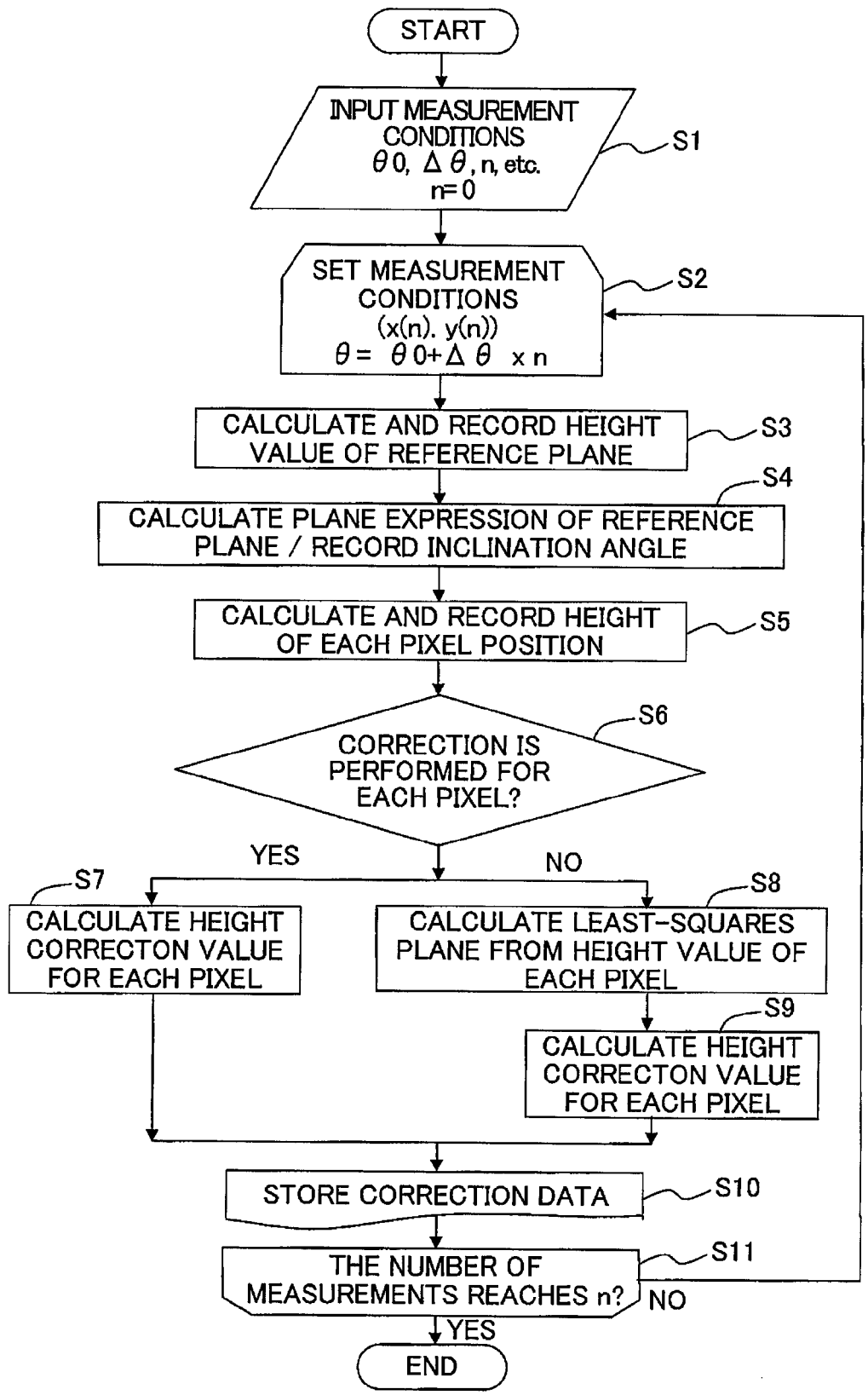
FIG. 7 is a flowchart in a case that an angle correction data is obtained by using a contact-type measuring probe.

FIG. 7 is a flowchart showing the first method for obtaining the angle correction data in which the angle correction data is obtained by using a reference plane; and the explanation thereof will be made in accordance with steps in the following description. In the first method for obtaining the angle correction data, the projection of the projection pattern 22b by the epi-illumination device 22 is unnecessary, provided that it is possible to obtain the contrast, such as texture, in the reference plane. Further, it is needless to say that the projection pattern 22b is projected to perform the SFF measurement, in a case that a mirror surface in which the contrast can not be obtained is used.

(Step S1)

The reference plane (mirror surface) is placed on the tilt/rotation stage 12 of the height measuring apparatus 1 by an operator. Then, an initial angle value θ0 and a measurement-angle spacing value Δθ of a measurement angle, the number of measurements n, and as to whether or not the height correction value for each pixel is obtained are inputted to the computer 18 by the operator.

(Step S2)

The reference plane is set to be a predetermined position and the initial angle value θ0, when the XY stage 10 and the tilt/rotation stage 12 receive respective instructions, from the computer 18, via the XY stage control section 20 and the θΦ control section 16.

(Step S3)

The computer 18 performs a multipoint measurement of the reference plane by the unillustrated TP device; and the height value at each pixel position, of the imaging device 38, which corresponds to each position at which the multipoint measurement is performed is calculated and recorded by the computer.

(Step S4)

The computer 18 obtains an expression of a plane regarding the reference plane by a method of least squares etc., based on the height value which is measured by the TP device and is recorded by the computer 18. Further, the computer 18 obtains a normal perpendicular to the reference plane to record the angle between the normal and the vertical axis (corresponding to the optical axis) as the inclination angle.

(Step S5)

The computer 18 measures the height value of the reference plane by the SFF measurement of the height measuring apparatus 1 using the imaging device 38; and the height value is recorded as an SFF height value at each pixel position of the imaging device 38.

(Step S6)

The computer 18 selects the subsequent process based on as to whether or not the height correction value for each pixel is obtained inputted in the step S1. In a case that the height correction value for each pixel is obtained, a step S7 is executed. In a case that the height correction value per all detecting region of the imaging device 38 is obtained, a step S8 is executed.

(Step S7)

The computer 18 calculates a difference between height value measurement data, at each position corresponding to each pixel obtained by the TP device, which is recorded in the step S3 and the SFF height value, at each pixel position, which is recorded in the step S4; and executes a step S10.

(Step S8)

The computer 18 calculates the least-squares plane based on the SFF height value at each pixel position recorded in the step S5. Instead of the calculation of the least-squares plane, it is allowable to calculate an average value of the height values at the positions corresponding to all of the pixels.

(Step S9)

The computer 18 calculates a difference between the least-squares plane calculated in the step S8 and the expression of the plane calculated in the step S4 as the height correction value to execute the step S10. As the height correction value, it is allowable to use a difference between the average value of the height values of all of the pixels and an average height value in the expression of the plane calculated in the step S4.

(Step S10)

The computer 18 associates the height correction value at each position corresponding to each pixel with the inclination angle to store the relation in the memory 18b as the angle correction data. Alternatively, the computer 18 stores the height correction value per all detecting region of the imaging device 38 with respect to the inclination angle in the memory 18b as the angle correction data.

(Step S11)

The computer 18 judges as to whether or not the number of measurements reaches the number of measurements n which is initially inputted in the step S1. In a case that the number of measurements does not reach the number of measurements n, the process is returned to the step S2; and the angle correction data with respect to the next inclination angle (θ=θ0+Δθ×n) is obtained. In a case that the number of measurements reaches the number of measurements n, the flow for obtaining the angle correction data is completed.

By performing the steps as described above, the first method for obtaining the angle correction data is completed by the computer 18. The obtained angle correction data is used for the correction of the height value in the height measuring apparatus 1 in accordance with a flow as will be described later on, and thereby realizing the height measurement with the high degree of accuracy.

(Second Method for Obtaining Angle Correction Data)

Figure 8:
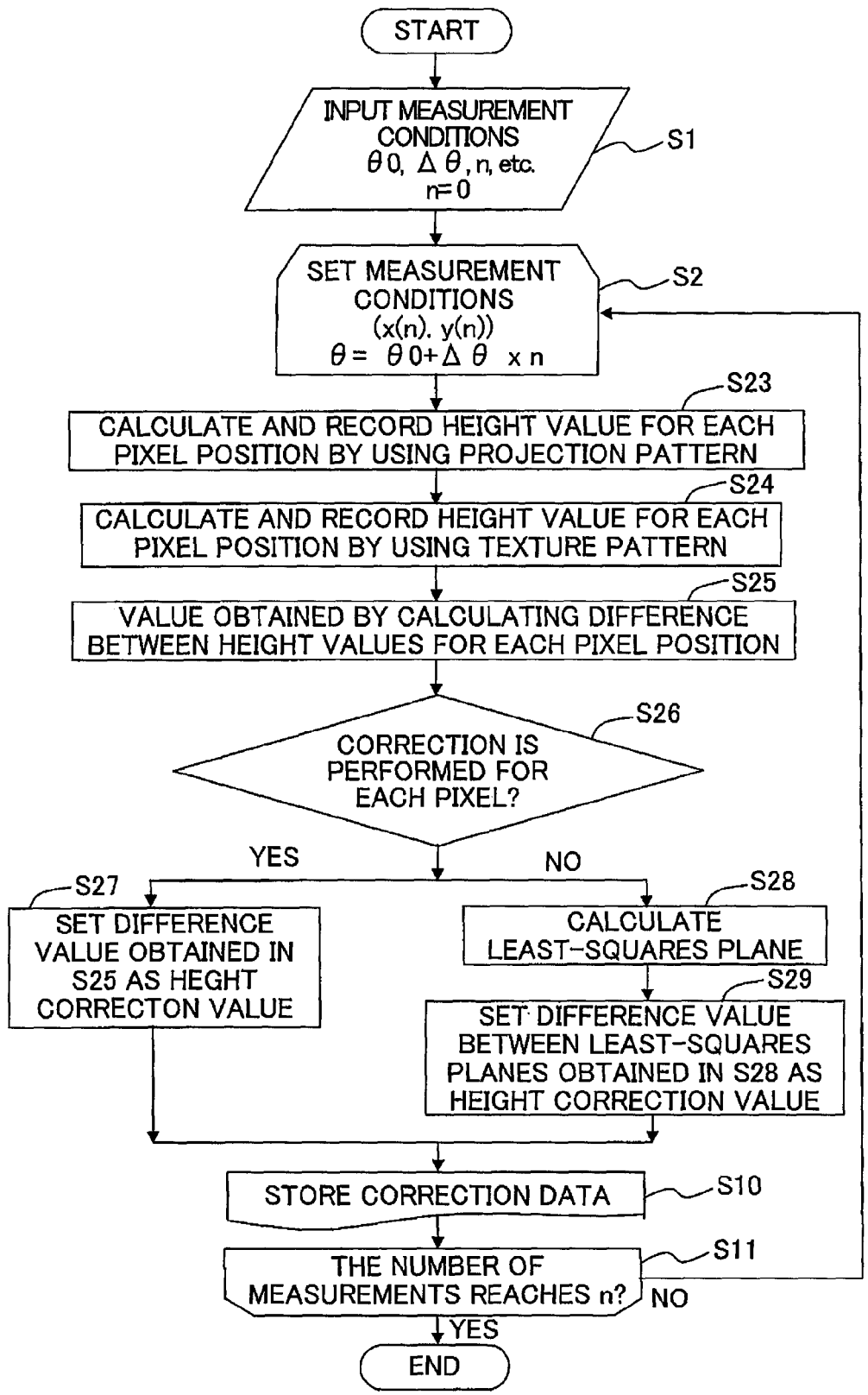
FIG. 8 is a flowchart in a case that the angle correction data is obtained by using a texture pattern and a projection pattern.

FIG. 8 is a flowchart showing the second method for obtaining the angle correction data in which the angle correction data is obtained by using the reference plane; and the explanation thereof will be made in accordance with steps in the following description. In the second method for obtaining the angle correction data, the reference plane has a texture pattern; the SFF measurement is performed by projecting the projection pattern 22b with the epi-illumination device 22; and the angle correction data is obtained based on both of the height value measurement data of the texture pattern and the height value measurement data of the projection pattern 22b. Further, the steps which are the same as or equivalent to those of the first method for obtaining the angle correction data are designated by the same reference numerals (step numbers), and explanation thereof will be made. Noted that it is preferable that frequency component of the projection pattern 22b to be projected is different from frequency component of the texture pattern. By using the patterns having different frequency components, it is possible to separate the projection pattern 22b from the texture pattern at the time of measuring the height.

(Step S1)

The reference plane (having the texture) is placed on the tilt/rotation stage 12 of the height measuring apparatus 1 by the operator. Then, the initial angle value θ0 and the measurement-angle spacing value Δθ of the measurement angle, the number of measurements n, and as to whether or not the height correction value for each pixel is obtained are inputted to the computer 18 by the operator.

(Step S2)

The reference plane is set to be the predetermined position and the initial angle value θ0, when the XY stage 10 and the tilt/rotation stage 12 receive respective instructions, from the computer 18, via the XY stage control section 20 and the θΦ control section 16.

(Step S23)

The computer 18 performs the SFF measurement by projecting the projection pattern 22b on the surface using the epi-illumination device 22 of the height measuring apparatus 1; and the height value corresponding to each pixel position of the imaging device 38 is calculated by the SFF height data calculation section 18e and is recorded by the computer 18. In this situation, the height measuring apparatus 1 is set to measure the height value by using the frequency component of the projection pattern 22b.

(Step S24)

The computer 18 performs the SFF measurement using the texture pattern; and the height value corresponding to each pixel position of the imaging device 38 is calculated by the SFF height data calculation section 18e and is recorded by the computer 18. In this situation, the height measuring apparatus 1 is set to measure the height value by using the frequency component of the texture pattern.

(Step S25)

The computer 18 calculates a difference between the height value, recorded in the step S23, at each pixel position, which is obtained by projecting the projection pattern 22b on the reference plane and the height value, recorded in the step S24, at each pixel position, which is obtained by using the texture pattern; and the difference between the height values at each pixel position is obtained.

(Step S26)

The computer 18 selects the subsequent process based on as to whether or not the height correction value for each pixel inputted in the step S1 is obtained. In a case that the height correction value for each pixel is obtained, a step S27 is executed. In a case that the height correction value per all detecting region of the imaging device 38 is obtained, a step S28 is executed.

(Step S27)

The computer 18 sets the difference calculated in the step S25 as the height correction value and executes the step S10.

(Step S28)

The computer 18 calculates respective least-squares planes based on the height value, recorded in the step S23, at each pixel position, which is obtained by projecting the projection pattern 22b, and the height value, recorded in the step S24, at each pixel position, which is obtained by using the texture pattern. Instead of the calculation of the least-squares planes, it is allowable to calculate respective average values of the height values of all of the pixels.

(Step S29)

The computer 18 calculates a difference between the respective least-squares planes calculated in the step S28 as the height correction value to execute the step S10. In a case that average values of the height values of all of the pixels are respectively calculated, it is allowable to use a difference between the respective average values as the height correction value.

(Step S10)

The computer 18 associates the height correction value at each position corresponding to each pixel with the inclination angle to store the relation in the memory 18b as the angle correction data. Alternatively, the computer 18 stores the height correction value per all detecting region of the imaging device with respect to the inclination angle in the memory 18b as the angle correction data.

(Step S11)

The computer 18 judges as to whether or not the number of measurements reaches the number of measurements n which is initially inputted. In a case that the number of measurements does not reach the number of measurements n, the process is returned to the step S2; and the angle correction data with respect to the next inclination angle ($\theta = \theta 0 + \Delta \theta \times n$) is obtained. In a case that the number of measurements reaches the number of measurements n, the flow for obtaining the angle correction data is completed.

By performing the steps as described above, the second method for obtaining the angle correction data is completed by the computer. The obtained angle correction data is used for the correction of the height value in the height measuring apparatus 1 in accordance with a flow as will be described later on, and thereby realizing the height measurement with the high degree of accuracy.

(Third Method for Obtaining Angle Correction Data)

Figure 9A:
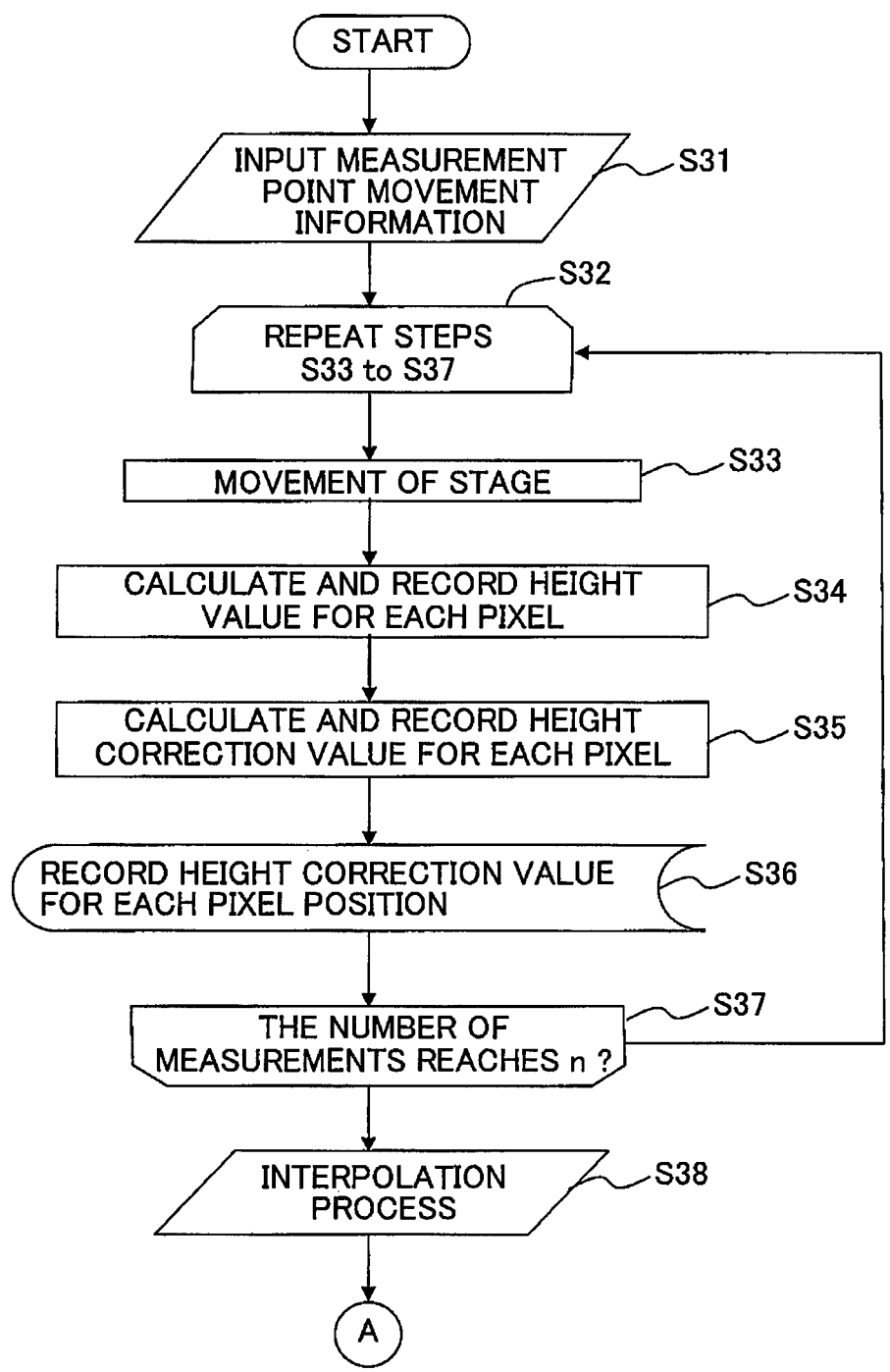
FIGS. 9A and 9B are flowcharts in a case that the angle correction data is obtained by using a reference sphere.
Figure 9B:
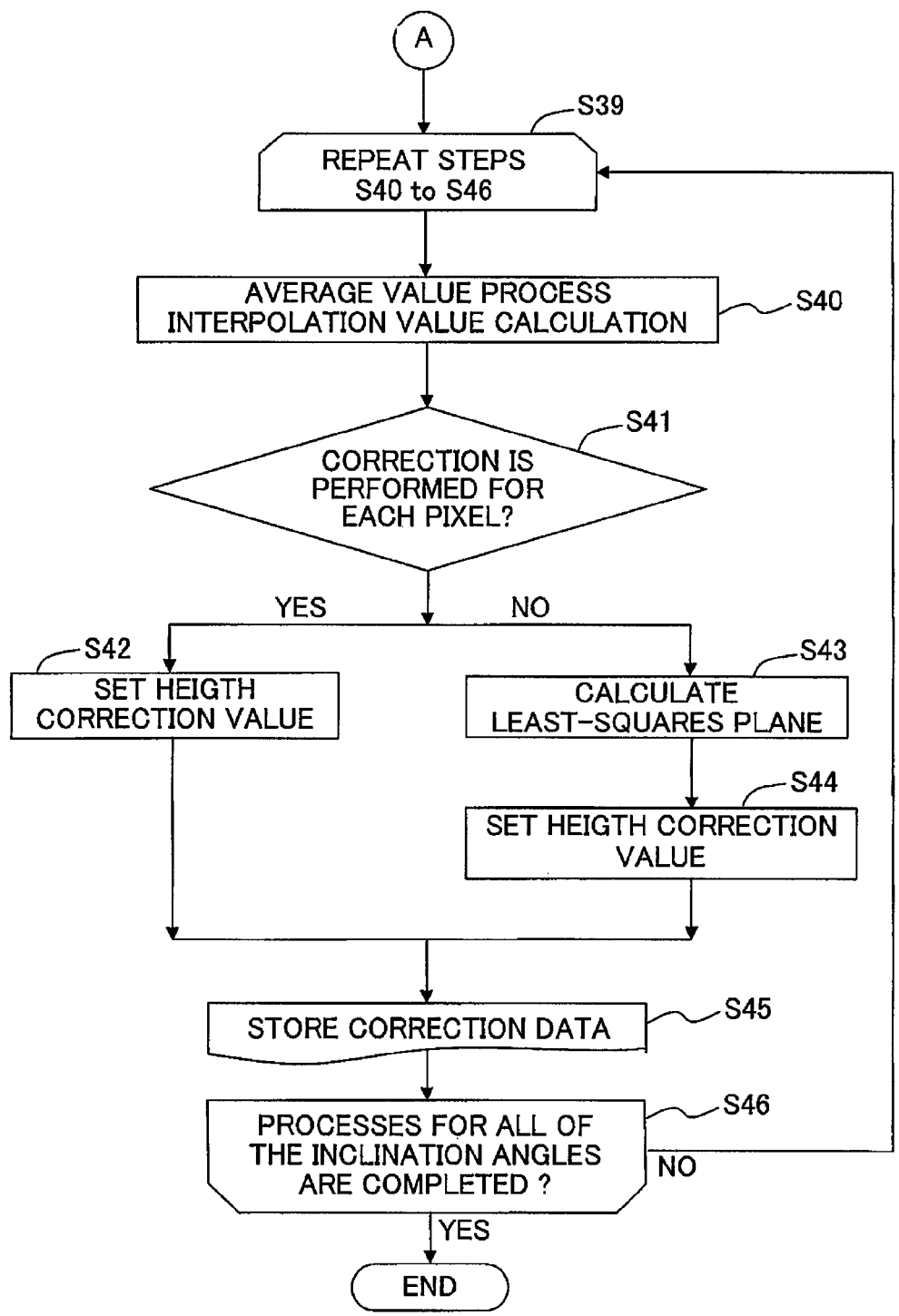

FIGS. 9A and 9B are flowcharts showing the third method for obtaining the angle correction data in which the angle correction data is obtained by using a reference sphere; and the explanation thereof will be made in accordance with steps in the following description. In the third method for obtaining the angle correction data, the projection of the projection pattern 22b by the epi-illumination device 22 is unnecessary, provided that it is possible to obtain the contrast, such as the texture, in the surface of the reference sphere. Further, it is needless to say that the projection pattern 22b is projected to perform the SFF measurement, in a case that the mirror surface in which the contrast can not be obtained is used. Further, since the objective is a sphere, it is unnecessary to use the tilt/rotation stage 12 of the height measuring apparatus 1. Therefore, the tilt/rotation stage 12 is removed from the XY stage 12.

(Step S31)

The operator inputs a position coordinate (X, Y), a coordinate displacement amount ($\Delta X$, $\Delta Y$) of the surface of the reference sphere, and the number of measurements n to the computer 18.

(Step S32)

The computer 18 repeats measurements of the following steps (steps S33 to S37).

(Step S33)

The computer 18 moves the XY stage 10 of the height measuring apparatus 1 to a designated position via the XY stage control section 20 to set the reference sphere in an optical path of the optical system.

(Step S34)

The computer 18 performs the height value measurement by the SFF in the height measuring apparatus 1. Then, the computer 18 calculates the height value at each pixel position of the imaging device 38 by the SFF height data calculation section 18e and records the height value.

(Step S35)

The computer 18 calculates a difference between a true height value at each pixel position of the surface of the reference sphere and the height value at each pixel position measured by the SFF and records the difference as the height correction value. Here, the true height value of the surface of the reference sphere is a height value obtained from the position coordinate (X, Y) of the surface of the reference sphere and the inclination angle between the vertical axis (corresponding to the optical axis I) and a normal of a tangent plane at the coordinate position. Regarding this, it is assumed that a radius of the reference sphere is R and the inclination angle is $\psi$, a true height value H is $H = R(1 + \cos \psi)$.

Instead of obtaining the true height value by the method as described above, it is possible to use, as the true height value, the height value obtained as follows. That is, a reference sphere having the texture on the surface is used and the height measurement is performed by the height measuring apparatus 1.

(Step S36)

The computer 18 associates the inclination angle at each pixel position obtained in the step S35 with the height correction value obtained from the difference. Then the computer 18 records the pair of data including the inclination angle and the height correction value.

(Step S37)

The computer 18 judges as to whether or not the number of measurements reaches the number of measurements n as an initial setting. In a case that the number of measurements does not reach the number of measurements n, the process is returned to the step S32; and the subsequent steps are executed by using a position coordinate in which the coordinate displacement amount (ΔX, ΔY) is added to the position coordinate (X, Y). In a case that the number of measurements reaches the number of measurements n, a step S38 is executed.

(Step S38)

Data of the height correction values obtained during the steps S32 to S37 are sorted for each of the inclination angles obtained during the steps S32 to S37, and a height correction value, the inclination angle of which is not yet measured, is obtained by an interpolation process and then is recorded.

(Step S39)

The computer 18 repeatedly executes processes of steps S40 to S46 with respect to values ranging from minimum to maximum values of data of the inclination angles.

(Step S40)

The computer 18 picks up the height correction value of a designated inclination value (from the minimum value to the maximum value) from among the data which have been subjected to the interpolation process and have been recorded in the step S38. In a case that there are a plurality of height correction values for the same inclination angle, an average value of the height correction values is set as the height correction value of the inclination angle.

(Step S41)

The computer 18 selects the subsequent process based on as to whether or not the height correction value for each pixel is obtained. In a case that the height correction value is obtained for each pixel, a step S42 is executed. In a case that the height correction value per all detecting region of the imaging device 38 is obtained, a step S43 is executed.

(Step S42)

The computer 18 obtains the height correction value at the position corresponding to each pixel position, which corresponds to each inclination angle recorded in the step S35; and executes a step S45.

(Step S43)

The computer 18 calculates the least-squares plane from the height correction value at each pixel position which corresponds to each inclination angle recorded in the step S35. Instead of the calculation of the least-squares plane, it is allowable to calculate an average value of the height correction values of all of the pixels.

(Step S44)

The computer 18 sets, as the height correction value, a difference between the height correction value of the least-squares plane at each pixel position of the imaging device calculated in the step S43 and the height at each pixel position of the reference sphere; and executes the step S45.

(Step S45)

The computer 18 associates the calculated height correction value with the inclination angle to store the relation in the memory 18b as the angle correction data. In this case, the height correction values, the number of which corresponds to the number of pixels of the imaging device, are recorded with respect to one inclination angle. Alternatively, the computer 18 stores, as the angle correction data, the height correction value per all detecting region of the imaging device 38 with respect to the inclination angle in the memory 18b.

(Step S46)

The computer 18 judges as to whether or not the processes of steps S40 to S46 are executed for values ranging from minimum to maximum values of data of the inclination angles. In a case that the processes are not completed, the process is returned to the step S39. Other than this case, the third method for obtaining the angle correction data is completed.

By performing the steps as described above, the third method for obtaining the angle correction data is completed by the computer. The obtained angle correction data is used for the correction of the height value in the height measuring apparatus 1 in accordance with a flow as will be described later on, and thereby realizing the height measurement with the high degree of accuracy.

(Method for Correcting Height Value)

Next, an explanation will be made, with reference to a flowchart of FIG. 10, about a method for correcting a height value measured by the height measuring apparatus 1 of this embodiment in which each of the angle correction data obtained by the first to third methods for obtaining the angle correction data is used.

(Step S51)

The data of the angle correction data stored in the memory 18b is read in a memory of the CPU 18a by the computer 18.

(Step S52)

The computer 18 performs the SFF measurement by the height measuring apparatus 1 with respect to the object 14 placed on the XY stage 10; calculates the height value of the surface of the object 14 placed on the XY stage 10 by the SFF height data calculation section 18e; and records the height value.

(Step S53)

The computer 18 repeatedly executes processes of steps S54 and S55 with respect to all of the pixels; and calculates the inclination angles at the positions corresponding to all of the pixels.

(Step S54)

After the measurement for all of the height values is completed in the step S52, the computer 18 calculates the inclination angle of the object 14 at the pixel position from height values of three pixels disposed around the pixel which is subjected to the measurement.

(Step S55)

The computer 18 obtains the height correction value, which corresponds to the calculated inclination angle at the pixel position, from the angle correction data; corrects the height value of the pixel by the obtained height correction value; and records the corrected height value. In a case that the correction of the height value is performed for each pixel, the computer 18 uses each of the angle correction data, as shown in FIG. 5, in which the inclination angles and the height correction values for all of the pixels are stored. On the other hand, in a case that the correction of the height value is performed per all detecting region of the imaging device 38, the computer 18 uses each of the angle correction data, as shown in FIG. 6, in which the inclination angles and the height correction values per all detecting region of the imaging device 38 are stored.

(Step S56, S57)

The computer 18 again calculates the inclination angle of each pixel by using the height value for each pixel corrected in the step S55. Then, the computer 18 calculates, for all of the pixels, a difference between the inclination angle calculated from the height value, the height of which is not yet corrected and the inclination angle obtained when the calculation is again performed; and then records the difference.

(Step S58)

The computer 18 collects or tallies up the difference value of the inclination angle for each pixel.

(Step S59)

The computer 18 judges as to whether or not a counted value of the difference value is not more than a predetermined threshold. In a case that the counted value of the difference value is not more than the threshold, the measurement is completed. On the other hand, in a case that the counted value of the difference value exceeds the threshold, the process is returned to the step S54 and the processes subsequent to the step S54 are repeated by the computer 18. As described above, by performing a convergence calculation in which the inclination angles are repeatedly calculated, the inclination angles are obtained more accurately, and thereby making it possible to perform the height correction more accurately.

In each of the methods described above, it is needless to say that the processes are executed by each of the programs executed by the SFF height data calculation section 18e and/or the CPU 18a of the computer 18.

As described above, in the height measuring apparatus of this embodiment, there is obtained the angle correction data as the height correction value depending on the inclination angle, which is obtained, in advance, by each of the first to third methods for obtaining the angle correction data. Then, the height value of the objective measured by the height measuring apparatus is corrected by using the height correction value. By correcting the height value of the objective, it is possible to correct the error of the height value due to the various aberrations such as the spherical aberration of the optical system used in the height measuring apparatus, and thereby making it possible to perform the height measurement with the high degree of accuracy. As a result, the height measuring apparatus of this embodiment is capable of measuring the three-dimensional profile of the objective more accurately.

What is claimed is:

1. A method for measuring heights of regions of an object by a height measuring apparatus which comprises an imaging device and an imaging optical system for forming an image of the object to an imaging plane of the image device, the method comprising:
    scanning of the object relative to the imaging optical system along an optical axis of the imaging optical system;
    acquiring height values of a region of the object based on a degree coming into focus acquired from images detected by the imaging device; and
    correcting a height value of a part of the region of the object by using a height correction value, the height correction value being selected by a slope angle of the part of the region of the object, the slope angle being obtained from the height values.

2. The method according to claim 1, wherein each of the height values corresponds to a pixel of the imaging device.

3. The method according to claim 2, further comprising:
    obtaining a temporary slope angle of the part of the region of the object based on the height value corresponding to each pixel of the imaging device; and
    correcting the height value by the height correction value which is set by the temporary slope angle.

4. The method according to claim 2, further comprising calculating the height correction value and the slope angle of the part of the region of the object by performing a convergence calculation based on the height value of each pixel of the imaging device obtained by correcting the height correction value corresponding to the temporary slope angle.

5. The method according to claim 2, wherein the height correction value is acquired from angle correction data which include a plurality of height correction values, and
    wherein the angle correction data include one of height correction values decided based on the slope angle of the part of the region of the object and a position of the pixel of the imaging device.

6. The method according to claim 5, further comprising:
    producing the angle correction data based on at least an inclination angle and a height value, measured by the height measuring apparatus, of the object
    wherein
    a height value corresponding to each pixel has been known, and
    the height correction value with respect to each pixel is a deviation value from a center value acquired by a least-squares method.

7. The method according to claim 5, further comprising:
    producing the angle correction data based on at least an inclination angle and a height value, measured by the height measuring apparatus, of the object
    wherein
    a height value corresponding to each pixel has been known, and
    the object used in a case that the height correction value is obtained in advance is a reference plane.

8. The method according to claim 2, wherein the object used in a case that the height correction value is obtained in advance is a reference sphere, of which a diameter has been known.

9. The method according to claim 2, further comprising projecting a pattern to the object.

10. The method according to claim 9, wherein:
    the object has a texture pattern;
    a spatial frequency of the texture pattern is different from a spatial frequency of the projection pattern; and
    the height correction value is obtained from angle correction data, the angle correction data has a slope angle of the part of the region of the object corresponding to each pixel position of the imaging device and the height correction value obtained from a difference between a measurement result of the height value using the texture pattern and a measurement result of the height value using the projection pattern.

11. A non-transitory computer readable medium storing a program for measuring a height of each region of an object, the program being used for a height measuring apparatus;
    wherein the program allows a computer to execute the method for measuring the height according to claim 1.

12. A height measuring apparatus which is configured to measure an object comprising:
    an illumination device configured to illuminate the object or project a projection pattern to the object;

an imaging device displaced on a position where an image of the object can be formed by an imaging optical system;

a scan mechanism configured to scan the object relative to the imaging optical system along an optical axis of the imaging optical system;

a height obtaining mechanism configured to obtain a height value of a region of the object by setting a position at which a degree coming into focus acquired from images detected by the imaging device is maximized as a surface position of the object; and a computer which is configured to execute the method for measuring the height of the object as defined in claim 1.

13. A non-transitory computer readable medium storing a program for measuring height of an object, the program being used for controlling a height measuring apparatus by a computer, wherein the program causes the computer to function as:

an obtaining means for obtaining, a height correction value with respect to an inclination value of a part of a region of the object;

a slope calculation means for obtaining, from height values of an image of the region of the object taken by the imaging device, a slope angle of the part of a region of the object which corresponds to a position of the imaging device; and a height value correction means for obtaining the height correction value, which is selected by the slope angle, and correcting the height value with the obtained height correction value.

14. A height measuring apparatus which is configured to measure an object comprising:

an illumination device which is configured to illuminate the object or project a projection pattern to the object;

an imaging device displaced on a position where an image of the object can be formed by an imaging optical system;

a scan mechanism which is configured to move the object relative to the imaging optical system along an optical axis of the imaging optical system;

a height obtaining mechanism which is configured to obtain height values of a region of the object by detecting positions at which a degree coming into focus acquired from images detected by the imaging device is maximized at a surface position of the object;

a storage unit which is configured to store a height correction value, with respect to a slope angle of a part of a region of the object;

a slope calculation mechanism which is configured to obtain, from height values of an image of the region of the object taken by the imaging device, the slope angle of the part of the region of the object which corresponds to a position of the imaging device; and a height correction mechanism which is configured to obtain the height correction value corresponding to the obtained slope angle from the height correction data selected by the slope angle, and to correct the height values with the height correction value.

15. The method of claim 1, wherein the slope angle of the part of the region of the object is the angle between the optical axis and the normal of the object tangent at the part of the region of the object.

16. The method of claim 1, wherein the slope angle of the part of the region of the object is obtained from at least three height values around the part of the region of the object.

* * * * *